(12) United States Patent
Pankoke

(10) Patent No.: US 12,510,381 B2
(45) Date of Patent: Dec. 30, 2025

(54) SUBASSEMBLY FOR A VEHICLE, AND VEHICLE

(71) Applicant: HELLA GmbH & Co. KGaA, Lippstadt (DE)

(72) Inventor: Martin Pankoke, Paderborn (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 352 days.

(21) Appl. No.: 18/076,479

(22) Filed: Dec. 7, 2022

(65) Prior Publication Data
US 2023/0110805 A1 Apr. 13, 2023

Related U.S. Application Data

(63) Continuation of application No. PCT/EP2021/064056, filed on May 26, 2021.

(30) Foreign Application Priority Data

Jun. 8, 2020 (DE) ...................... 10 2020 115 138.1

(51) Int. Cl.
G01D 11/24 (2006.01)
G01D 5/14 (2006.01)

(52) U.S. Cl.
CPC ........... *G01D 11/245* (2013.01); *G01D 5/145* (2013.01)

(58) Field of Classification Search
CPC ....................................... G01D 11/245
USPC .............................. 175/50; 174/50
See application file for complete search history.

(56) References Cited

U.S. PATENT DOCUMENTS

| 5,469,032 A * | 11/1995 | Otake ................... B60L 3/0038 361/23 |
| 9,322,645 B2 | 4/2016 | Elpermann et al. |
| 9,945,694 B2 | 4/2018 | Elpermann et al. |
| 10,193,415 B2 | 1/2019 | Ihben et al. |
| 2002/0097044 A1 | 7/2002 | Tateishi et al. |
| 2015/0168140 A1* | 6/2015 | Elpermann ............ G01B 21/22 73/431 |

(Continued)

FOREIGN PATENT DOCUMENTS

| CN | 109708788 A | 5/2019 |
| CN | 110001780 A | 7/2019 |
| DE | 3915019 A1 | 11/1989 |

(Continued)

OTHER PUBLICATIONS

International Search Report dated Sep. 15, 2021 in corresponding application PCT/EP2021/064056.

*Primary Examiner* — Stanley Tso
(74) *Attorney, Agent, or Firm* — Muncy, Geissler, Olds & Lowe, P.C.

(57) ABSTRACT

A subassembly for a vehicle, having a housing with a first housing part and a rotational body which is rotatably arranged on the first housing part about a rotational axis when the subassembly is in the installed state, wherein the axial position of the rotational body relative to the first housing part is fixed by the first housing part when the subassembly is in the installed state. In order to improve a subassembly for a vehicle and a vehicle equipped therewith, the invention proposes that the axial position of the rotational body relative to the first housing part is fixed solely by the first housing part when the subassembly is in the installed state.

10 Claims, 8 Drawing Sheets

(56) References Cited

U.S. PATENT DOCUMENTS

| | | | |
|---|---|---|---|
| 2017/0234503 A1* | 8/2017 | Buffone | F21S 41/148 362/509 |
| 2021/0150304 A1* | 5/2021 | St. Regis | G01D 5/02 |

FOREIGN PATENT DOCUMENTS

| | | | |
|---|---|---|---|
| DE | 4335733 A1 | | 4/1995 |
| DE | 102005058131 A1 | | 6/2007 |
| DE | 102007047899 A1 | | 6/2009 |
| DE | 102011104386 | * | 12/2012 |
| DE | 102011104386 A1 | | 12/2012 |
| DE | 102012105969 A1 | | 1/2014 |
| DE | 102012105963 A1 | | 5/2014 |
| EP | 1517121 A2 | | 3/2005 |
| EP | 3079238 A1 | | 10/2016 |
| JP | 2004333159 A | | 11/2004 |
| KR | 200439157 Y1 | | 3/2008 |
| KR | 1020090110167 A | | 10/2009 |
| KR | 101326191 B1 | | 11/2013 |

\* cited by examiner

SUBASSEMBLY FOR A VEHICLE, AND VEHICLE

This nonprovisional application is a continuation of International Application No. PCT/EP2021/064056, which was filed on May 26, 2021, and which claims priority to German Patent Application No. 10 2020 115 138.1, which was filed in Germany on Jun. 8, 2020, and which are both herein incorporated by reference.

BACKGROUND OF THE INVENTION

Field of the Invention

The present invention relates to a subassembly for a vehicle and to a vehicle with such a subassembly.

Description of the Background Art

Subassemblies for vehicles and vehicles are already known from the prior art in numerous embodiments. The known subassemblies for vehicles comprise a housing with a first housing part and a rotational body which is rotatably arranged on the first housing part about an axis of rotation when the subassembly is in the installed state, wherein an axial position of the rotational body relative to the first housing part is fixed by the first housing part when the subassembly is in the installed state.

For example, from DE 10 2012 105 969 A1, which corresponds to US 2015/0168140, which is incorporated herein by reference, a subassembly formed as electronics of a sensor for a vehicle is known. The known electronics comprises a first housing part, a second housing part and a printed circuit board, wherein the two housing parts are joined together in an installed state of the electronics to form a housing along a subassembly axis, and wherein the circuit board is arranged in the installed state of the electronics between the first housing part and the second housing part and fixed in their axial position by the two housing parts relative to the first housing part. For good measurement accuracy of the sensor formed for determining the angle of rotation, it is particularly important that a stator positioned on the circuit board and a rotational body formed as a sensor gear for determining a rotor position of a rotor of the sensor relative to the first housing part in the housing are positioned as accurately as possible.

In the conventional art, however, a major challenge is that the electronics must function properly under harsh environmental conditions, such as large temperature differences and strong vibrations, over a long period of time, ideally over the entire service life of the vehicle equipped with it. The circuit board and the sensor gear must be fixed accordingly. The fixing of the axial position of the circuit board and the axial position of the sensor gear relative to the first housing part and the second housing part of the housing is typically carried out by welding the two housing parts during the manufacture of the housing.

This is where the present invention comes in.

SUMMARY OF THE INVENTION

It is therefore an object of the present invention to improve a subassembly for a vehicle and a vehicle equipped therewith.

This object is achieved in an exemplary embodiment by a subassembly, which is characterized in that the axial position of the rotational body relative to the first housing part is fixed solely by the first housing part when the subassembly is in the installed state.

A significant advantage of the invention is in particular that a subassembly for a vehicle and a vehicle equipped therewith are improved. Due to the inventive formation of the subassembly for a vehicle and of a vehicle, it is possible, for example, to manufacture the subassembly more easily and thus more cost-effectively. The fixation of the rotational body according to the invention with the first housing part thus not only allows for sufficient fixation of the axial position of the rotational body relative to the first housing part, even under extreme environmental conditions, but can also eliminate the need for an expensive welding process. In addition, the invention has the advantage over the above-mentioned prior art that the materials of the individual components of the subassembly can be selected more freely. For example, materials with sliding properties, such as sliding plastics with Teflon content or the like, can be used, which could not be used in a required welding due to poor or missing welding properties. Regardless of the concrete embodiment, the fundamental advantage of the invention is that for fixing the axial position of the rotational body relative to the first housing part in the installed state no further components, such as a second housing part, are required.

Basically, the subassembly according to the invention is freely selectable according to type, function, application, material, dimensioning and arrangement within wide suitable limits.

The first housing part can have a plurality of locking hooks and the rotational body has a locking depression corresponding to the locking hooks, wherein the locking hooks and the locking depression have mutually corresponding contact surfaces and the locking hooks are biased by their contact surfaces in a locking position of the respective locking hook parallel to the axis of rotation against the circumferential contact surface of the locking depression when the subassembly is in the installed state. In this way, the inventive fixation of the axial position of the rotational body relative to the first housing part is implemented in a constructively particularly simple and robust manner when the subassembly is in the installed state. Furthermore, unwanted noise emission of the subassembly is prevented by the aforementioned bias, but at least largely reduced, since this bias prevents an axial play between the rotational body and the first housing part.

The first housing part can comprise a spring element, wherein the spring element is biased against the rotational body such that the mutually corresponding contact surfaces of the locking hooks and the locking depression are biased against each other when the subassembly is in the installed state. As a result, the bias of the locking hooks of the first housing part against the locking depression of the rotational body can be realized in a particularly simple way. The spring element may be formed as a separate spring element or as a spring element integrated in the first housing part. For example, the spring element may be designed as a separate spring plate or a spring tongue formed from the rest of the first housing part.

The locking hooks and the locking depression can be formed and arranged in such a coordinated manner and arranged to each other that the locking of the locking hooks with the locking depression is essentially inseparable when the subassembly is in the installed state. In this way, the locking of the locking hooks with the locking depression is self-locking, so that additional components of the subassembly to secure the locking can be dispensed with.

The first housing part and the rotational body can be formed and arranged in such a coordinated manner and arranged to each other that the locking of the locking hooks with the locking depression is visually perceptible when the subassembly is in the installed state. This makes it possible to visually inspect the locking of the locking hooks with the locking depression with regard to their proper locking, so that the production is further simplified. For example, the aforementioned visual inspection during the production of the subassembly according to the invention can be carried out largely automatically by a camera. In contrast, inspection by a button or the like, i.e., a non-contact-free inspection of the locking, would be much more time-consuming and costly.

The first housing part and the rotational body can be formed and arranged in such a coordinated manner and arranged to each other that the rotational body preferably substantially sealingly covers the locking hooks and the locking depression on one side in the direction of the free environment when the subassembly is in the installed state. In this way, the locking hooks and the locking depression are protected on one side without further components, such as a housing cover or the like, against environmental influences that are detrimental to their function. This applies in particular to the preferred embodiment of this development.

A second housing part of the subassembly can be formed and can be fastened on one side of the first housing part facing away from the rotational body such that the second housing part preferably substantially sealingly covers the first housing part on one side in the direction of the free environment when the subassembly is in the installed state. As a result, the locking hooks and the locking depression are protected on both sides against environmental influences that are detrimental to their function. This in turn applies in particular to the preferred embodiment of this development.

The two housing parts can have a mutually corresponding lock, wherein the mutually corresponding lock of the two housing parts interlock while connecting the two housing parts to each other when the subassembly is in the installed state. In this way, it is possible, for example, to completely dispense with expensive welded joints when transferring the subassembly to its installed state.

The first housing part can be designed such that the first housing part can be produced as an injection-molded part in an injection molding tool formed only as an open-close tool. As a result, the production of the first housing part is additionally simplified and thus made more cost-effective. For example, the injection molding tool may be formed as a plastic injection molding tool. In this context, "open-close tool" can be, for example, an injection molding tool that has no elaborate slide technology or the like, but only two tool halves that are closed to inject the injection molded part and opened for removal of the injection molded part after injection molding.

Basically, the subassembly according to the invention is advantageously applicable for a variety of different applications. However, another advantageous development of the subassembly according to the invention provides that the subassembly is formed as an electronics of a sensor and the rotational body as a sensor gear, preferably that the sensor is formed for determining a rotational position of a rotor of the sensor relative to the first housing part by a stator of the sensor arranged on the first housing part. Especially when determining a rotational position, for example a steering angle and/or a steering torque in a steering wheel of a vehicle, high accuracy is required. Accordingly, the use of the invention in this field of application is advantageous.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 4A:
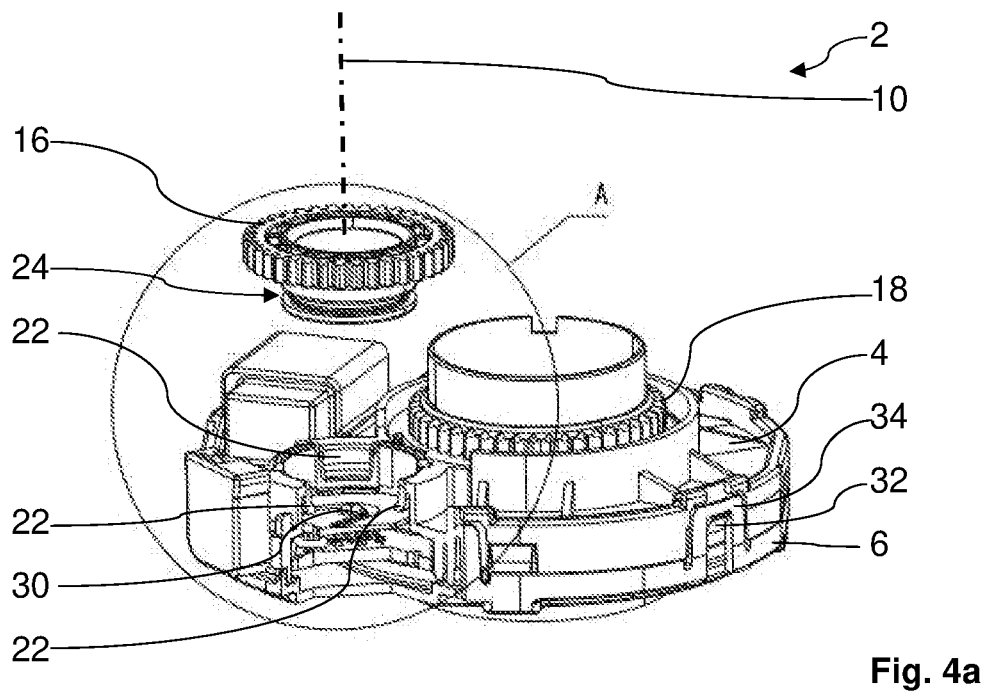
FIGS. 4a and 4b show the first embodiment in a first perspective view, in a partially assembled state, in normal size and an enlarged detail view.
Figure 4B:
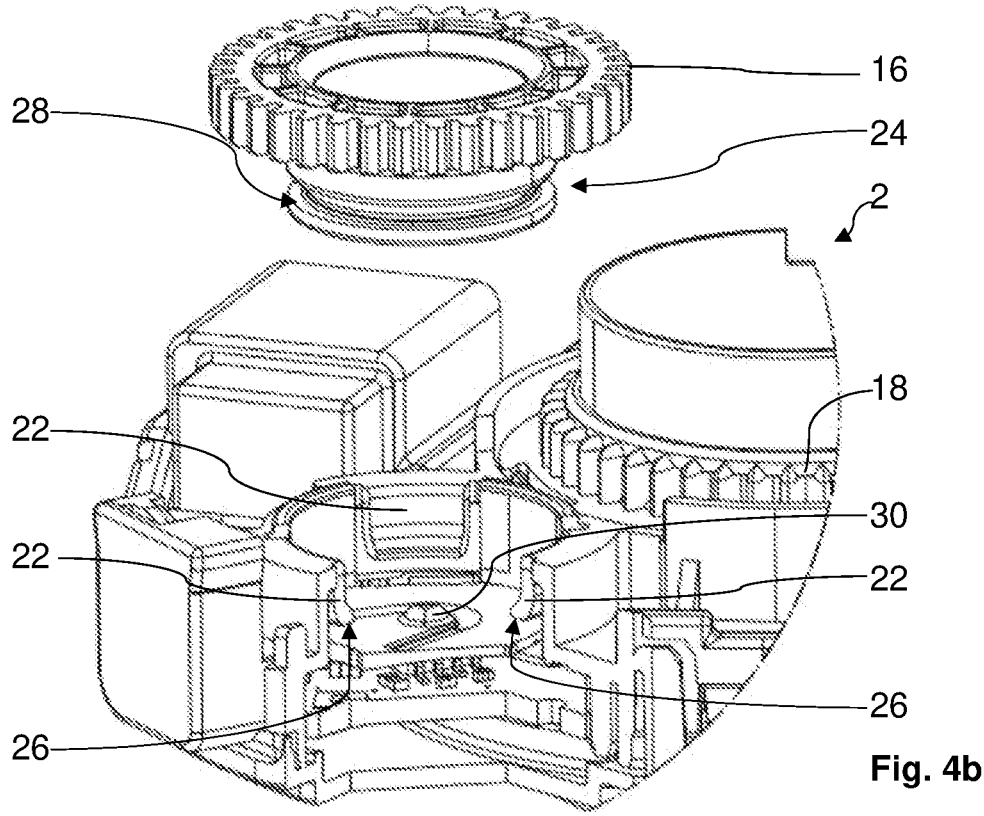
Figure 5A:
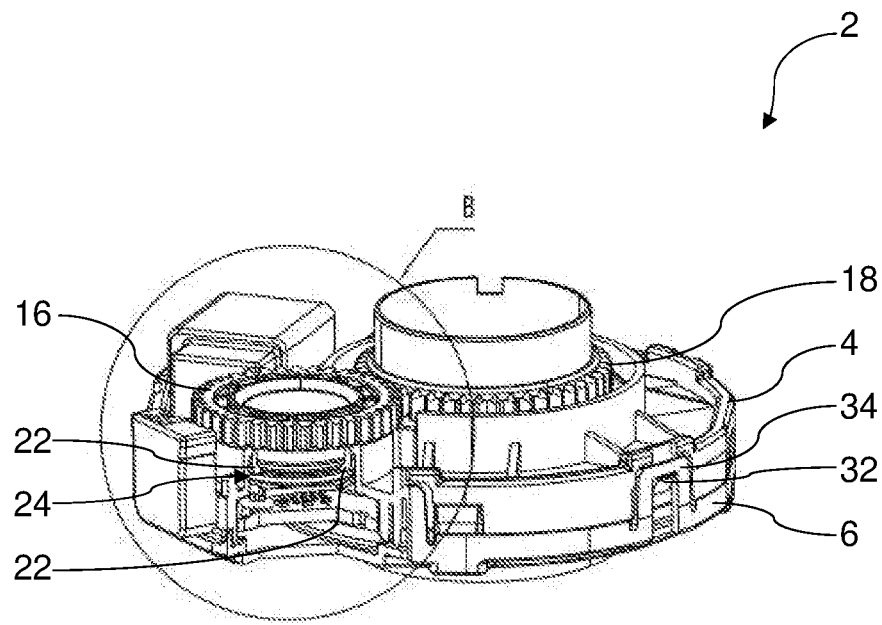
FIGS. 5a and 5b show the first embodiment in a second perspective view, in the installed state of the subassembly, in normal size and an enlarged detail view.
Figure 5B:
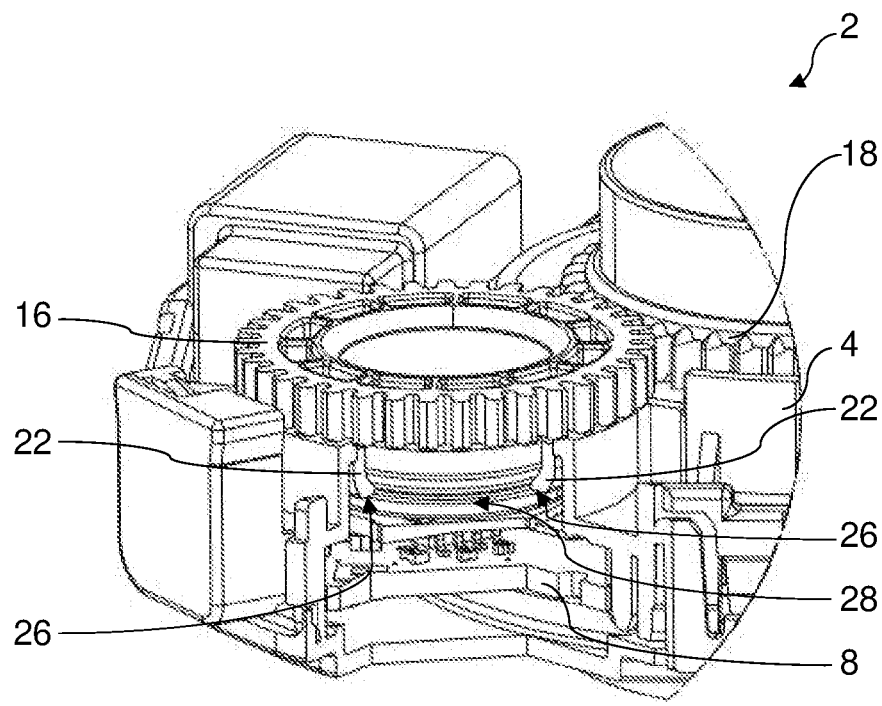
Figure 6A:
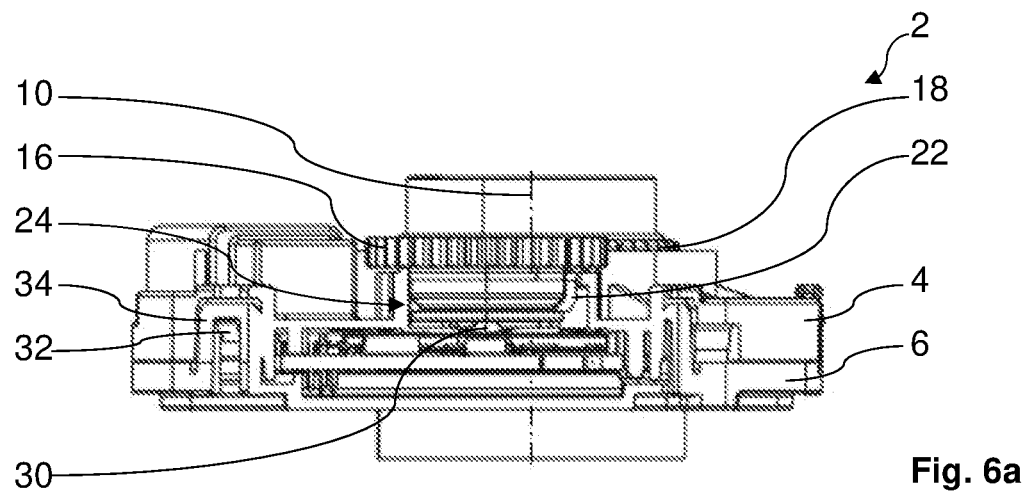
FIGS. 6a and 6b show the first embodiment in a second plan view and a partially cut first side view, in the installed state of the subassembly.
Figure 6B:
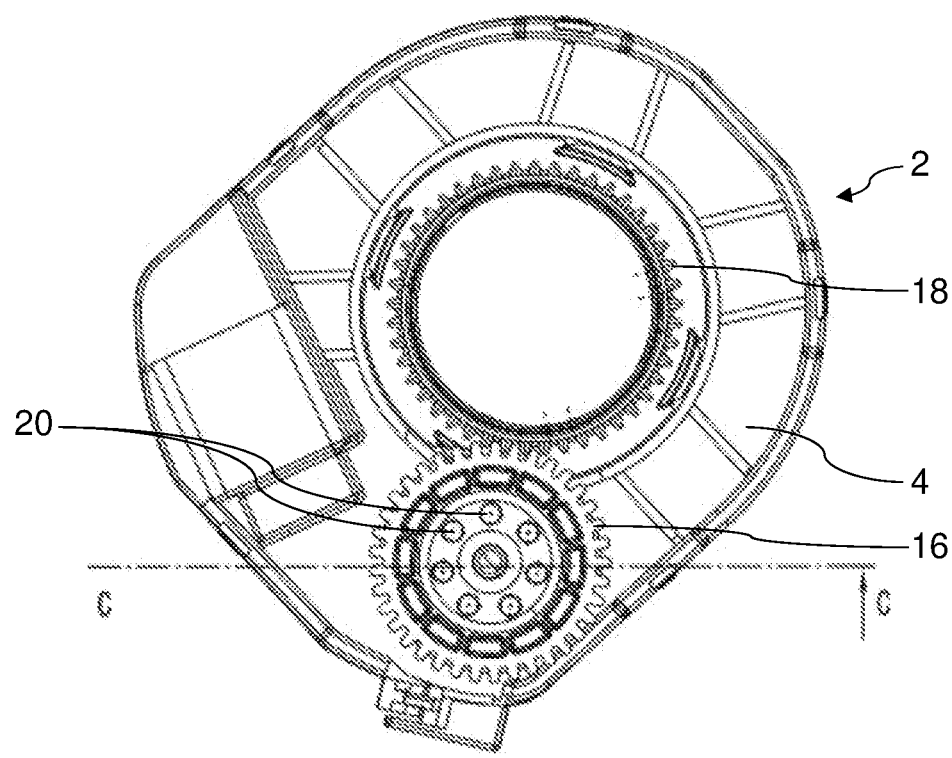
Figure 7C:
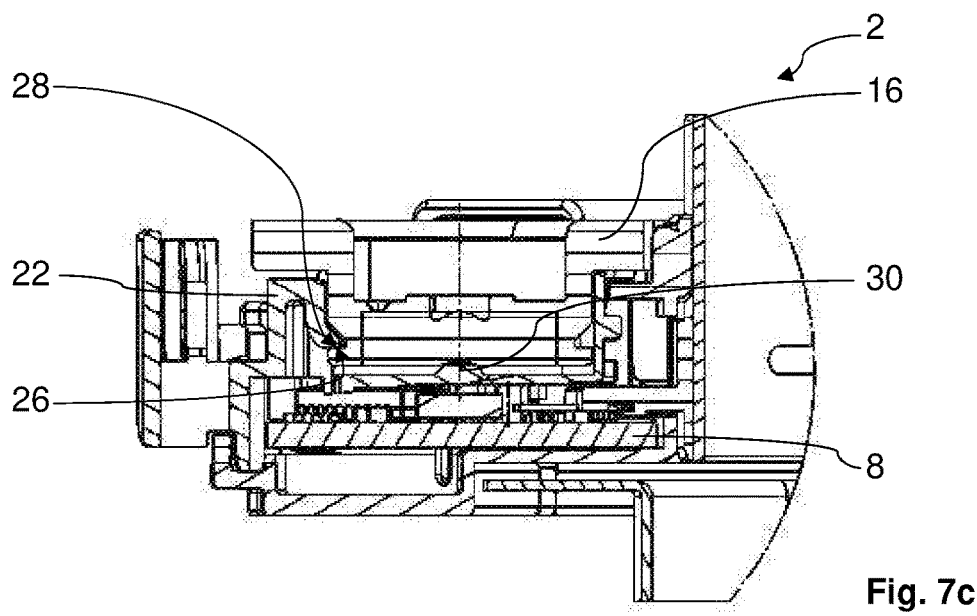
FIGS. 7a to 7c show the first embodiment in a third plan view and a partially cut second side view, in normal size and an enlarged detail view, in the installed state of the subassembly.
Figure 7B:
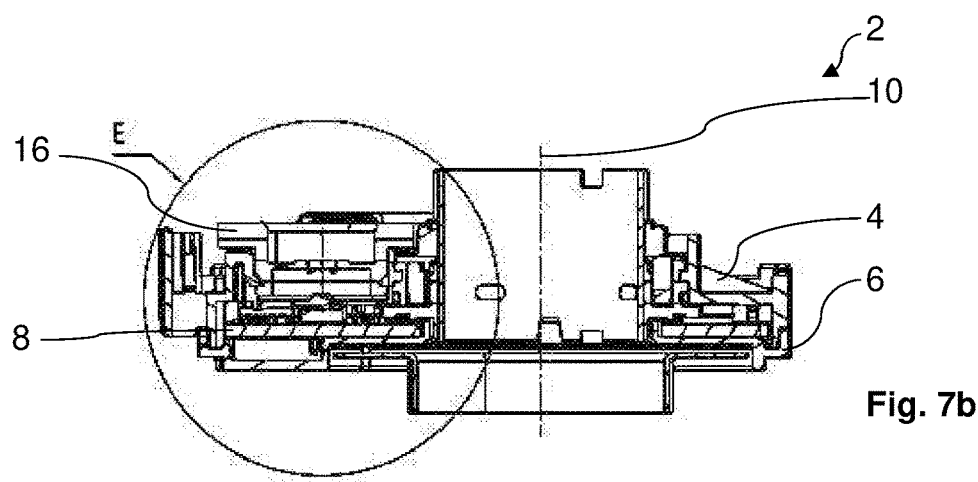
Figure 7A:
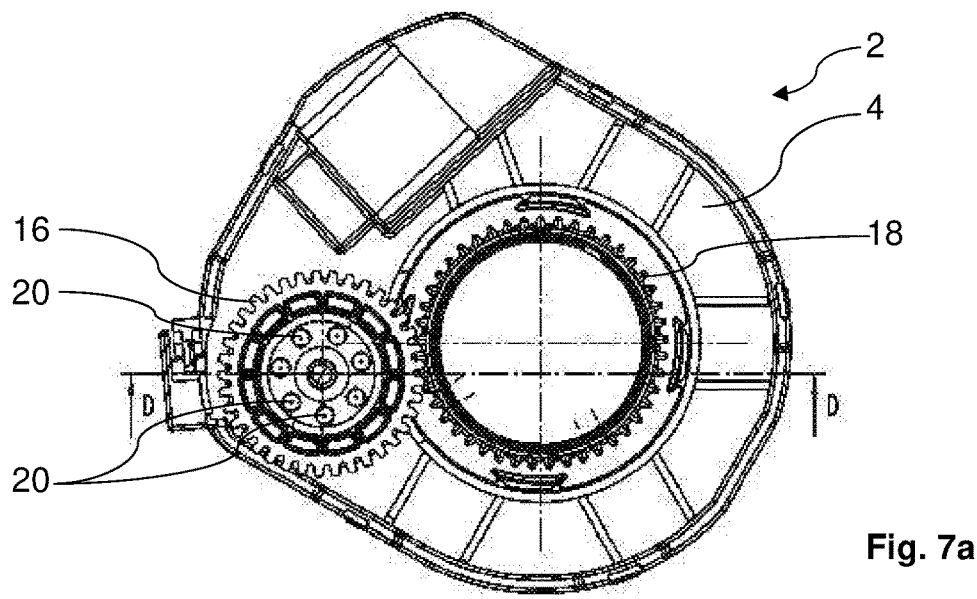
Figure 8B:
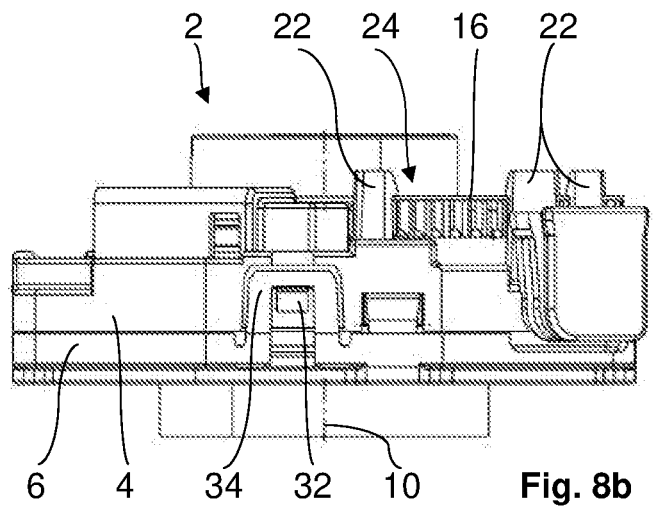
FIGS. 8a to 8c illustrates a second embodiment of the subassembly according to the invention in a plan view, a frontal view and a side view, in the installed state of the subassembly.
Figure 8C:
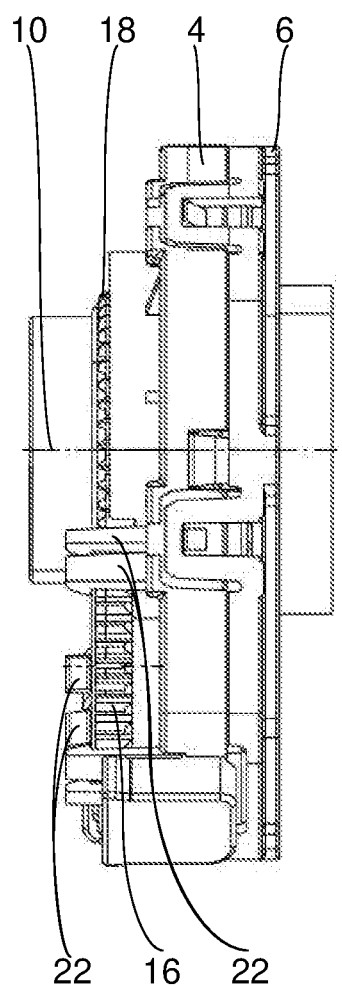
Figure 8A:
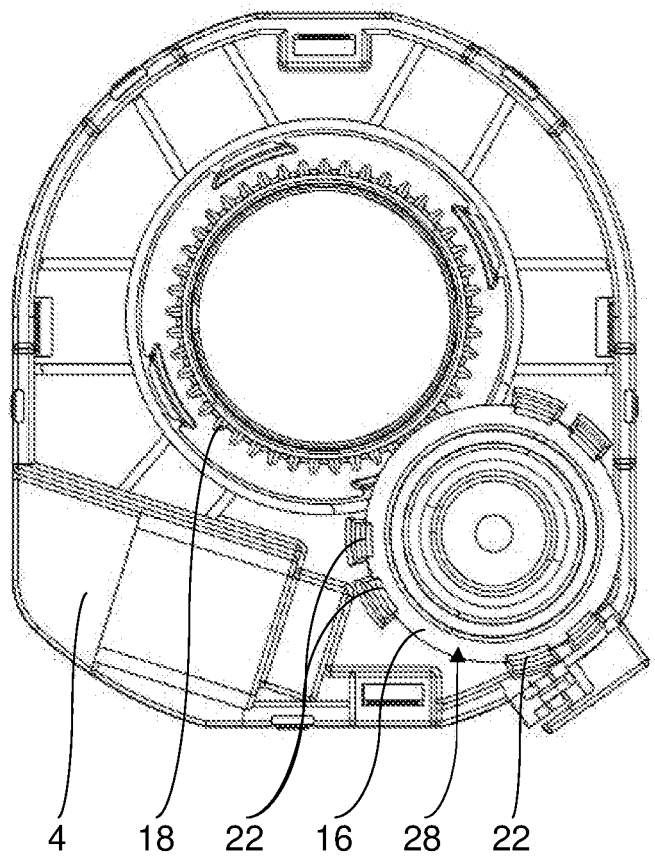
Figure 9C:
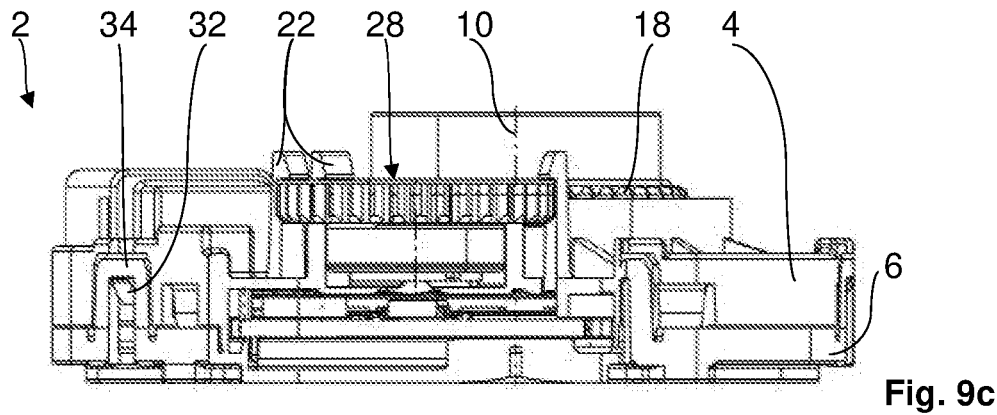
FIGS. 9a to 9c show the second embodiment in two perspective views and a side view, each in a partially cut representation.
Figure 9A:
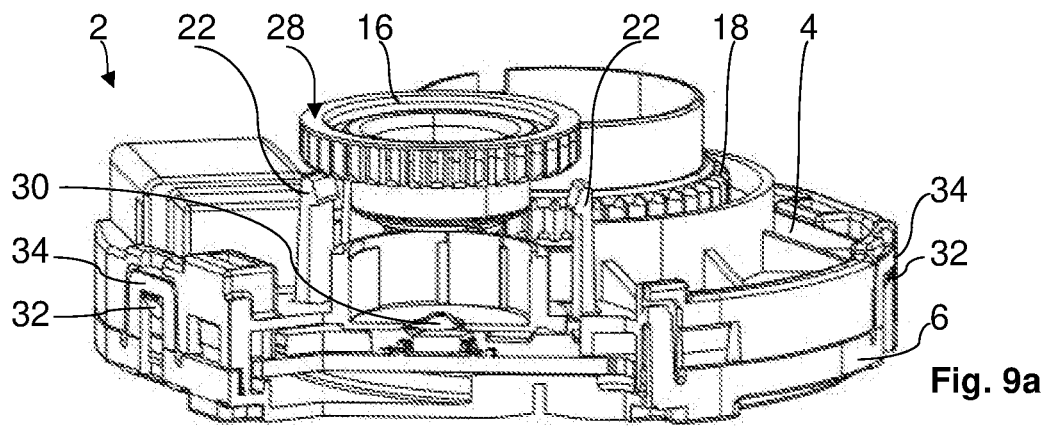
Figure 9B:
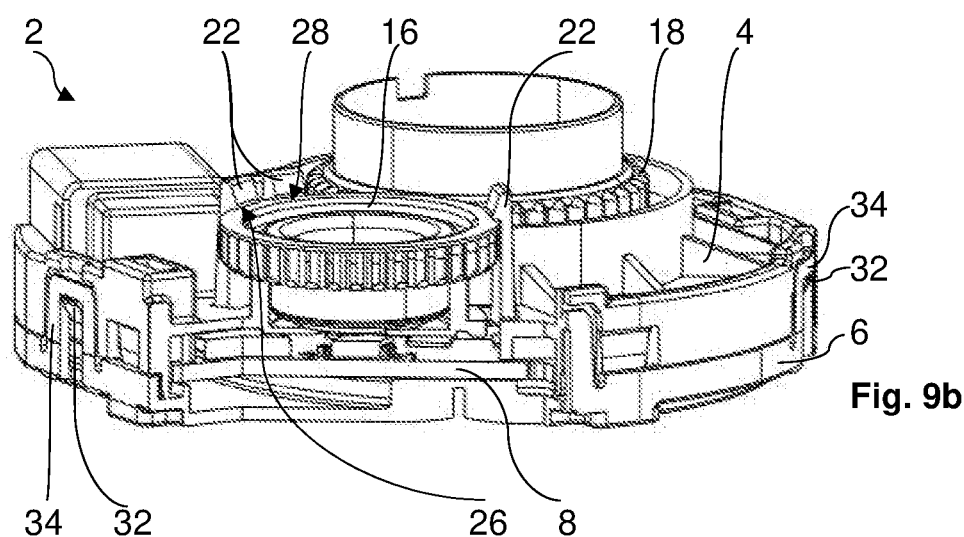

FIGS. 1 to 7c show a first embodiment of the subassembly according to the invention purely as an example, wherein FIG. 4b shows the detail "A" from FIG. 4a, FIG. 5b shows the detail "B" from FIG. 5a, FIG. 6a shows the section "C-C" from FIG. 6b, FIG. 7b shows the section "D-D" from FIG. 7a and FIG. 7c shows the detail "E" from FIG. 7b.

The subassembly 2 is designed as an electronics for a combined steering angle/steering torque sensor for a steering shaft of a steering wheel of a motor vehicle. The motor vehicle and the steering wheel with the steering shaft, on which the subassembly 2 is arranged in a manner known in the art, are not shown in FIGS. 1 to 7c.

The subassembly 2 comprises a first housing part 4, a second housing part 6 and a printed circuit board 8, wherein the two housing parts 4, 6 are joined together shown in FIGS. 5a to 7c to form a housing along an assembly axis 10 when the subassembly 2 is in the installed state, and wherein the printed circuit board 8 is arranged between the first housing part 4 and the second housing part 6 when the subassembly 2 is in the installed state and is fixed in their axial position relative to the first housing part 4 by the two housing parts 4, 6. The above-mentioned combined steering angle/steering torque sensor is designed as an inductive sensor with two rotors 12, 14 and a stator corresponding to the two rotors 12, 14, wherein the stator not shown is arranged in a manner known in the art on the circuit board 8.

In order to ensure high accuracy in determining the steering angle and the steering torque by the combined steering angle/steering torque sensor even under adverse environmental conditions, an exact axial positioning of the circuit board 8 and an exact axial positioning of a rotational body 16 formed as a sensor gear relative to the first housing part 4, i.e., along the subassembly axis 10, is required. The rotational body 16 is attached in the present embodiment about a rotational axis, not shown, which is rotatable to the first housing part 4 running parallel to the subassembly axis 10 when the subassembly 2 is in the installed state. The rotational body 16 formed as a sensor gear acts in a torque-transmitting manner with a transmission gear 18 connected to the steering shaft of the steering wheel in a torque-transmitting manner and has a plurality of a total of seven permanent magnets 20, which interact in a manner known in the art with at least one Hall sensor, not shown, which is arranged on the circuit board 8.

The axial position of the rotational body 16 relative to the first housing part 4 is fixed solely by the first housing part 4 when the subassembly 2 is in the installed state. For this purpose, the first housing part 4 has a total of three locking hooks 22 and the rotational body 16 a locking depression 24 corresponding to the locking hooks 22 and formed as a circumferential groove, wherein the locking hooks 22 and the locking depression 24 have mutually corresponding contact surfaces 26, 28 and the locking hooks 22 are biased by their contact surfaces 26 in a locking position of the respective locking hook 22 parallel to the axis of rotation, i.e., parallel to the subassembly axis 10, against the circumferential contact surface 28 of the locking depression 24 when the subassembly 2 is in the installed state. See in particular FIGS. 4*a* to 5*b*. For the purpose of the aforementioned bias, the first housing part 4 has a spring element 30 formed as an integral part of the first housing part 4, wherein the spring element 30 is biased against the rotational body 16 in such a way that the mutually corresponding contact surfaces 26, 28 of the locking hooks 22 and the locking depression 24 are biased against each other when the subassembly 2 is in the installed state.

Furthermore, the locking hooks 22 and the locking depression 24 are designed and arranged in such a coordinated manner and arranged to each other that the locking of the locking hooks 22 with the locking depression 24 is essentially inseparable when the subassembly 2 is in the installed state. Accordingly, the locking connection between the rotational body 16 on one side and the first housing part 4 on the other side, established by the locking hooks 22 and the locking depression 24, can no longer be subsequently released when the subassembly 2 is in the installed state, so that the locking of the rotational body 16 with the first housing part 4, despite adverse environmental conditions such as large temperature differences and vibrations, is guaranteed over the entire service life of the motor vehicle without additional safety elements.

In addition, the first housing part 4 and the rotational body 16 are designed and arranged in such a coordinated manner and arranged to each other that the locking of the locking hooks 22 with the locking depression 24 is visually perceptible when the subassembly 2 is in the installed state. This is made possible in that the locking of the locking hooks 22 with the locking depression 24 is visually perceptible with a view to the side of the first housing part 4 facing away from the rotational body 16, for example, with viewing direction from bottom to top in the respective image plane of FIGS. 7*b* and 7*c*, and thus accessible for visual inspection by a camera or the like when the subassembly 2 is in the installed state.

In order to effectively protect the aforementioned locking of the locking hooks 22 with the locking depression 24 from environmental influences detrimental to their function, such as moisture or dirt, it is provided in the present embodiment, on the one hand, that the first housing part 4 and the rotational body 16 are designed and arranged in such a coordinated manner that the rotational body 16 covers the locking hooks 22 and the locking depression 24 on one side in the direction of the open environment, in particular substantially sealingly, when the subassembly 2 is in the installed state. See, for example, FIGS. 5*a*, 5*b*, 6*a*, 7*b* and 7*c*, wherein the rotational body 16 protects the aforementioned locking in the respective image plane from top to bottom from unwanted environmental influences, without an additional housing cover or the like.

On the other hand, it is provided for this purpose in the present embodiment that the second housing part 6 of the subassembly 2 is designed and can be fastened on one side of the first housing part 4 facing away from the rotational body 16 in such a way that the second housing part 6 covers the first housing part 4 on one side in the direction of the free environment, namely substantially sealingly, when the subassembly 2 is in the installed state. See, for example, FIGS. 5*a*, 5*b*, 6*a*, 7*b* and 7*c*, wherein the second housing part 6 protects the aforementioned locking in the respective image plane from bottom to top from unwanted environmental influences. By the second housing part 6, it is thus possible to visually inspect the aforementioned locking prior to installation of the second housing part 6 in the manner explained above for its proper condition and then to protect said locking on one side after the installation of said second housing part 6 by the second housing part 6 against unwanted environmental influences.

As a result, when the subassembly 2 is in the installed state and after installation of the second housing part 6, there is protection on both sides of the aforementioned locking of the function of the locking hooks 22 and the locking depression 24 against negative environmental influences.

For the purpose of connecting the two housing parts 4, 6, these have mutually corresponding locks 32, 34, wherein the mutually corresponding locks 32, 34 of the two housing parts 4, 6 interlock while connecting the two housing parts 4, 6 to each other when the subassembly 2 is in the installed state. Accordingly, the use of complex and expensive welding processes is completely dispensable in the present embodiment.

The two housing parts 4, 6 and the rotational body 16 are each formed as a plastic injection molded part, wherein the first housing part 4 and the second housing part 6 are designed such that the first housing part 4 and the second housing part 6 can each be produced in an injection molding tool formed only as an open-close tool.

In the following, the operation of the subassembly according to the invention is explained in more detail according to the first embodiment based on FIGS. 1 to 7*c*.

Figure 1:
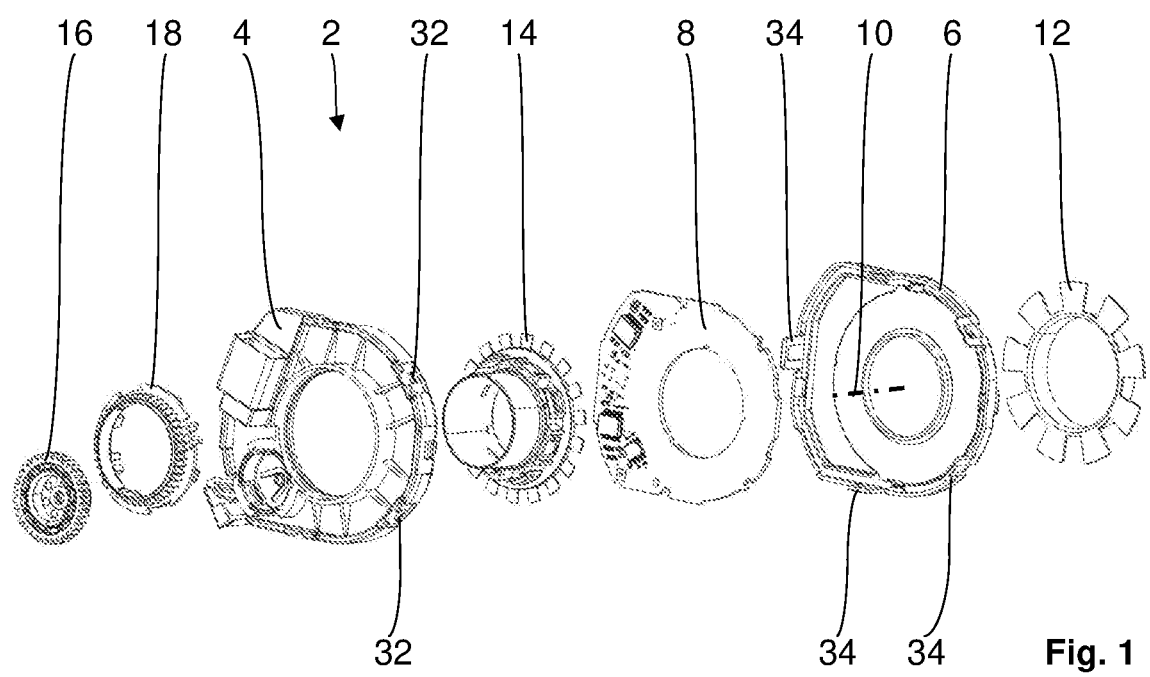
FIG. 1 is a first embodiment of the subassembly according to the invention in an exploded view.
Figure 2:
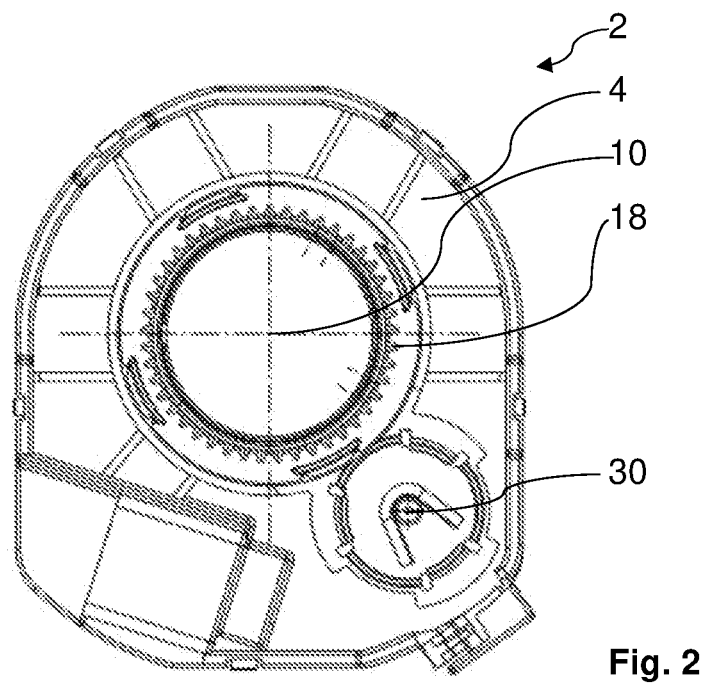
FIG. 2 is the first embodiment in a first plan view, in a partially assembled state.
Figure 3:
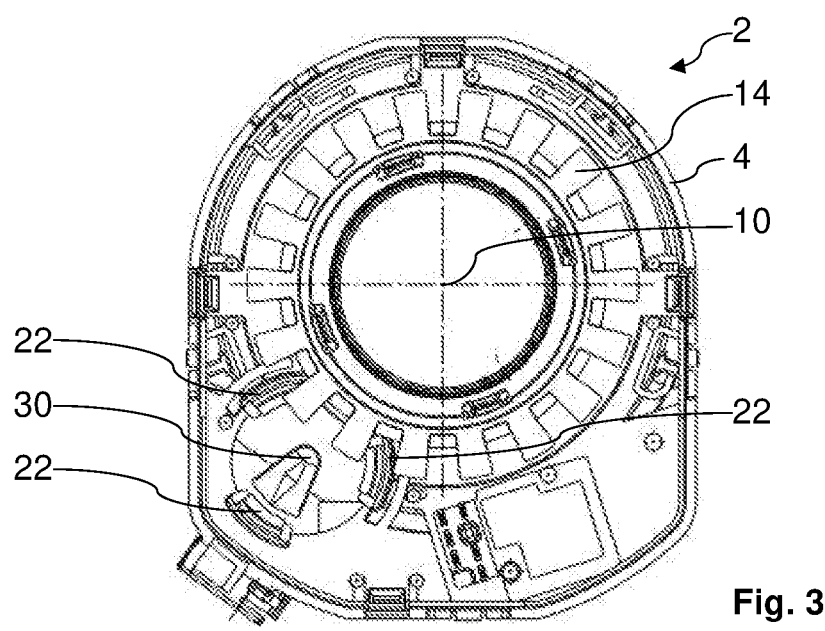
FIG. 3 is the first embodiment in a bottom view, in a partially assembled state.

First, the subassembly 2 is in a disassembled state shown in FIG. 1. For the purpose of transferring the subassembly 2 from its disassembled state to its installed state shown in FIGS. 5*a* to 7*c*, inter alia, the rotatable body 16 designed as a sensor gear is attached to the first housing part 4. For this purpose, the rotational body 16 is moved in the respective image plane of FIGS. 4a and 4b from top to bottom along the subassembly axis 10 in the direction of the first housing part 4. As soon as the rotational body 16 comes into engagement with the three locking hooks 22, the rotational body 16 presses the locking hooks 22 radially outwards. The rotational body 16 is further moved parallel to the subassembly axis 10 from top to bottom until its stop at the spring element 30 of the first housing part 4 in the respective image plane of FIGS. 4a and 4b. In this case, the three locking hooks 22 of the first housing part 4 lock with the locking depression 24 of the rotational body 16 formed as a circumferential groove. Due to the above-explained coordinated formation of the first housing part 4 with the locking hooks 22 and the spring element 30 and the rotational body 16 with the locking depression 24, the spring element 30 presses in the now present installed state of the subassembly 2 against the rotational body 16 in such a way that this is biased with its circumferential contact surface 28 against the contact surfaces 26 of the locking hook 22 of the first housing part 4. For this purpose, see FIGS. 5a to 7c in which the installed state of the subassembly 2 is shown. Due to the aforementioned bias, unwanted noise emissions of the subassembly 2 in its installed state are effectively prevented, or at least reduced. In the installed state of the subassembly 2, the rotational body 16 substantially sealingly covers the locking in the manner explained above, so that the locking hooks 22 and the locking depression 24 are protected on one side against environmental influences detrimental to their function. Since the second housing part 6 is not yet assembled, the proper state of the aforementioned locking can be inspected by a camera or the like as already explained. Subsequently, the second housing part 6 is snapped onto the subassembly 2 present in its installed state by the mutually corresponding locks 32, 34 of the two housing parts 4, 6, so that the aforementioned locking of the rotational body 16 with the first housing part 4 is protected on both sides from environmental influences detrimental to their function.

FIGS. 8a to 9c show a second embodiment of the subassembly according to the invention for a vehicle purely by way of example. Identical or equivalent components are designated with the same reference signs as in the first embodiment. The second embodiment is explained only within the scope of the distinguishing features to the first embodiment. Otherwise, reference is made to the above explanations of the first embodiment.

In contrast to the first embodiment, when the subassembly 2 is in the installed state, the locking hooks 22 of the first housing part 4 are arranged, i.e., formed, on the first housing part 4 accessible from the free environment, as shown in FIGS. 8a to 8c, 9b and 9c. Accordingly, the locking of the locking hooks 22 of the first housing part 4 with the locking depression 24 of the rotational body 16 can be released again when the subassembly 2 is in the installed state. If this is not desired, for example to ensure proper locking even in the case of environmental influences adversely influencing the locking, such as major temperature fluctuations or vibrations, the locking hooks 22 would have to be secured depending on the application against an unwanted rebound of the locking hooks 22, i.e., an unwanted movement of the locking hooks 22 radially outwards. This can be done, for example, by a housing cover or the like. The phrase "radial" refers here to the axis of rotation of the rotational body 16, not shown, running parallel to the assembly axis 10.

Due to the inventive formation of the subassembly for a vehicle and a vehicle according to the above-explained embodiments, it is thus possible to produce the subassembly 2 more easily and thus more cost-effectively. The inventive fixation of the rotational body 16 on the first housing part 4 thus not only allows for sufficient fixation of the axial position of the rotational body 16 relative to the first housing part 4, even under extreme environmental conditions, but may also eliminate the need for an expensive welding process. In addition, the materials of the individual components of the subassembly 2 can be selected more freely as compared to the prior art. For example, materials with sliding properties, such as sliding plastics with Teflon content or the like, can be used, which could not be used in a required welding due to poor or missing welding properties. Regardless of the specific embodiment, the fundamental advantage of the invention is that no further components are required to fix the axial position of the rotational body 16 relative to the first housing part 4 when the subassembly 2 is in the installed state.

The invention is not limited to the present embodiments. For example, the invention is also advantageously applicable in other land vehicles, but also in sea and air vehicles. The use of the subassembly according to the invention is of course not limited to the determination of a steering angle and/or a steering torque of a steering wheel of a vehicle. Also, the subassembly does not necessarily have to be designed as an electronics. Accordingly, the invention can be used for a variety of different applications.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A subassembly for a vehicle, the subassembly comprising:
   a housing with a first housing part; and
   a rotational body that is rotatably arranged on the first housing part about an axis of rotation when the subassembly is in an installed state in which the rotational body is locked to the first housing part,
   such that when the rotational body is locked to the first housing part, the rotational body is freely rotatable with respect to the first housing part,
   wherein an axial position of the rotational body relative to the first housing part is fixed solely by the first housing part when the subassembly is in the installed state,
   wherein the first housing part comprises a plurality of locking hooks and the rotational body comprises a locking depression corresponding to the locking hooks,
   wherein the locking hooks each have a contact surface that mutually corresponds to a circumferential contact surface of the locking depression,
   such that the contact surfaces of the locking hooks are biased against the circumferential contact surface of the locking depression in a locking position of the locking hooks parallel to the axis of rotation when the subassembly is in the installed state,
   and
   wherein the first housing part has a spring element,
   wherein the spring element is biased against the rotational body such that the mutually corresponding contact surfaces of the locking hooks and the locking depression are biased against each other when the subassembly is in the installed state.

2. The subassembly according to claim 1, wherein the locking hooks and the locking depression are arranged such that in the locking position, when the subassembly is in the installed state, the locking hooks and the locking depression are inseparable from one another.

3. The subassembly according to claim 1, wherein the first housing part and the rotational body are arranged such that the locking of the locking hooks with the locking depression is visually perceptible when the subassembly is in the installed state.

4. The subassembly according to claim 1, wherein the first housing part and the rotational body are arranged in such that the rotational body sealingly covers the locking hooks and the locking depression on one side in a direction of the free environment when the subassembly is in the installed state.

5. The subassembly according to claim 4, wherein the housing further includes a second housing part that is adapted to be fastened on a side of the first housing part facing away from the rotational body when the subassembly is in the installed state, such that the second housing part sealingly covers the first housing part on one side in the direction of the free environment.

6. The subassembly according to claim 5, wherein the first and second housing parts have mutually corresponding locks, wherein the mutually corresponding locks of the first and second housing parts interlock while connecting the first and second housing parts together.

7. The subassembly according to claim 1, wherein the first housing part is produced as an injection-molded part in an injection molding tool formed only as an open-close-tool.

8. The subassembly according to claim 1, wherein the subassembly is formed as electronics of a sensor and the rotational body as a sensor gear, and wherein the sensor is formed for determining a rotational position of a rotor of the sensor relative to the first housing part by a stator of the sensor arranged on the first housing part.

9. A vehicle comprising a subassembly according to claim 1.

10. The subassembly according to claim 1, wherein the axial position of the rotational body relative to the first housing part is fixed when the subassembly is in the installed state, such that the rotational body is immovable in an axial direction, with respect to the axis of rotation, in the installed state.

* * * * *